United States Patent
Uchino

[11] 3,945,121
[45] Mar. 23, 1976

[54] DEVICE FOR PREVENTING ERROR IN SLIDE CALIPERS

[75] Inventor: Kenju Uchino, Utsunomiya, Japan

[73] Assignee: Yehan Uchino, Yokohama, Japan

[22] Filed: Apr. 17, 1972

[21] Appl. No.: 244,459

[30] Foreign Application Priority Data
June 30, 1971 Japan............... 46-57312[U]

[52] U.S. Cl. ......... 33/147 T; 33/143 M; 33/DIG. 12
[51] Int. Cl.² .......................................... G01B 5/02
[58] Field of Search .......... 33/143 M, 143 J, 143 K, 33/147 T, 147 J, DIG. 12; 74/409

[56] References Cited
UNITED STATES PATENTS

| | | | |
|---|---|---|---|
| 2,846,769 | 8/1958 | Colont............... | 33/147 T |
| 3,397,590 | 8/1968 | Prentice............. | 74/409 |
| 3,477,304 | 11/1969 | Young................ | 74/409 |

FOREIGN PATENTS OR APPLICATIONS

| | | | |
|---|---|---|---|
| 489,774 | 6/1970 | Switzerland........ | 33/147 T |
| 371,239 | 5/1939 | Italy.................. | 33/147 I |

OTHER PUBLICATIONS

"Antibacklash Devices and Backlash Calculation," Michalec, *Machine Design*, pp. 200–205, Feb., 1955.

Primary Examiner—Richard E. Aegerter
Assistant Examiner—Richard R. Stearns
Attorney, Agent, or Firm—Brisebois & Kruger

[57] ABSTRACT

Slide calipers having gear-driven digital counter are provided with spring for applying torsional bias to the gearing so as to eliminate backlash, and consequent error in measurement.

3 Claims, 3 Drawing Figures

DEVICE FOR PREVENTING ERROR IN SLIDE CALIPERS

BACKGROUND OF THE INVENTION

This invention relates to slide calipers in which the relative movement of the two jaws is transmitted through intermediate gearing to a digital counter and indicator, and particularly to means for eliminating errors in measurement by such calipers due to backlash in the gearing.

In conventional arrangements for eliminating backlash in such calipers a coil-spring is provided between a gear rotatably engaging a pinion shaft meshing with a rack and said pinion shaft itself. A slight rotational movement is thereby imparted to the pinion when the latter meshes with the rack, thus eliminating backlash between the pinion and rack. When such a spring is provided between the gear and pinion shaft two gears are needed and it is therefore impossible to make the device as compact as desired. The present invention is intended to overcome this difficulty.

SUMMARY OF THE INVENTION

The primary object of the present invention is to provide calipers including a counter which provides a digital display representative of the displacement between the jaws of the calipers.

A second object of the invention is to provide a device for preventing an error in measurement due to backlash in the gearing when gearing is used to transmit the relative movement between the jaws to the digital counter.

A third object of the invention is to prevent backlash in the gearing by causing mutually opposite torsion between two gear trains, i.e., a first gear train which converts the linear movement of a slider carrying one of the caliper jaws into rotational movement, which is transmitted to the counter, and a second gear train which also serves to convert the linear movement of the slider to rotational movement, but is not directly interlocked with the counter.

A fourth object of the present invention is to provide slide calipers in which the rack on the main beam extends the full length of the path of travel of the slider on the beam and two shafts carrying pinions which mesh with the rack are supported on the slider. One of these two shafts is directly connected to the counter-wheel in the first stage of the counter and the other shaft is journalled at one end in a support carried by the slider. The gears carried by the two shafts are connected to each other by a spring.

A fifth object of the invention is to utilize helical or bevel gearing or the like in such calipers.

A sixth object of the invention is to provide in such calipers a spring which is torsion-loaded.

Other objects of the invention will become apparent from a reading of the following description of a preferred embodiment, with reference to the accompanying drawings, in which.

Figure 1:
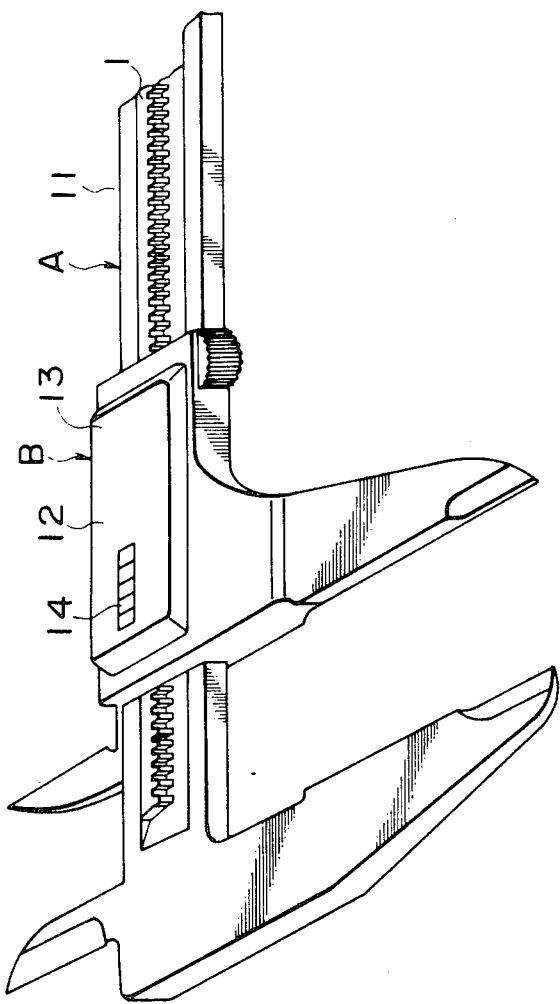
FIG. 1 is a perspective view of calipers according to the invention.

Referring now to FIG. 1, the calipers 11 comprise a slider B, slidably mounted on the main beam A. This slider carries a built-in counter 12 which provides a digital display of the dimension measured. The counter is positioned beneath a cover 13 provided with a window 14 through which the numbers displayed by the counter are visible. A rack 1 on the main beam A extends the full length of the path of travel of the slider B.

Figure 2:
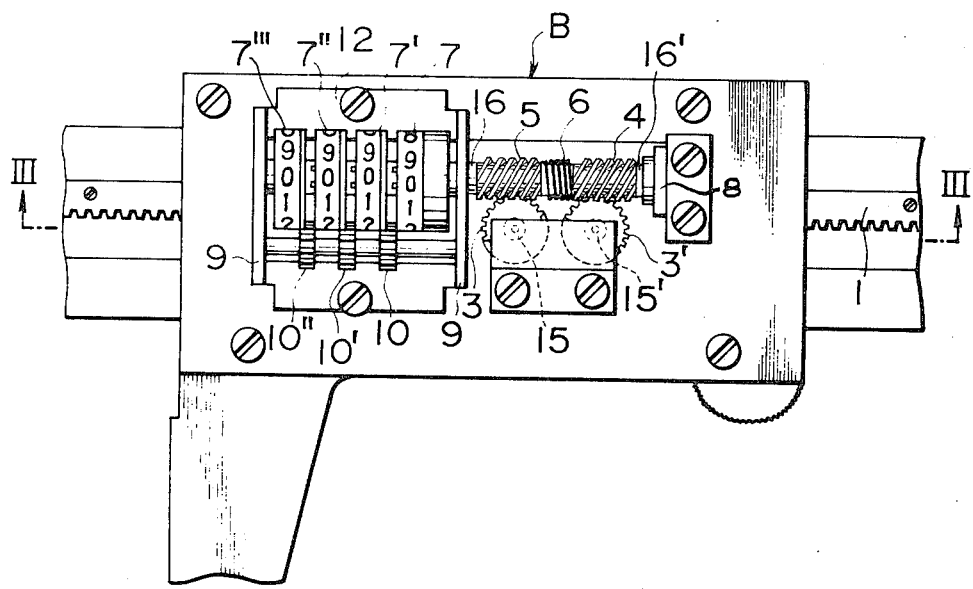
FIG. 2 is an enlarged plan view of the slider of said calipers, with the cover removed.
Figure 3:
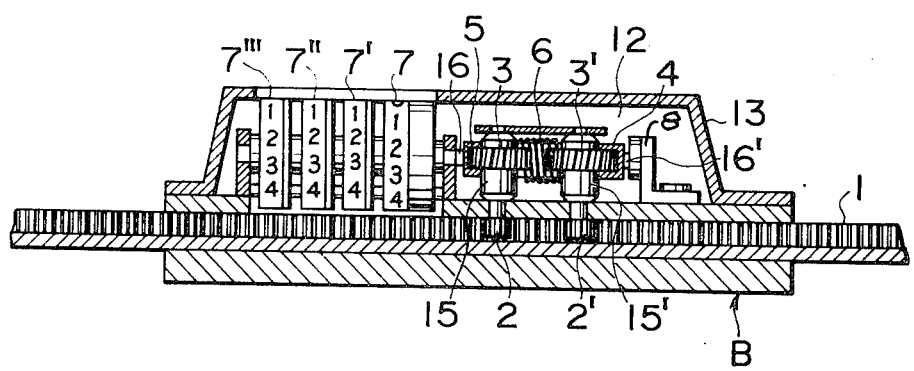
FIG. 3 is a sectional view taken along the line III—III of FIG. 2.

Referring next to FIGS. 2 and 3, the shafts 15, 15' carrying pinions 2, 2', are journalled in the slider B, and the pinions 2, 2' mesh with the rack 1. The shafts 15, 15' also carry helical gears 3, 3' which engage mating helical gears 4, 5 to drive the counter, having an axis at right angles to the shafts 15, 15'. Bevel gearing could be used at this point, but ordinary spur and worm gearing would be unsuitable because such gearing would reduce the rotational speed. Any number of teeth may be used on the various gears, so long as the speed ratio is not affected.

The slider B coaxially supports the shafts 16, 16' carrying the helical gears 4, 5, so that the shafts 16, 16' are driven by the shafts 15, 15' respectively. The shaft 16' is journalled at one end in a bracket 8 carried by the slider, and the shaft 16 is fixed to the first stage counter wheel 7 in the counter 12. Counter wheels 7, 7', 7'', and 7''' for the different stages of the counter are located between the supports 9 of the counter 12, and digit-shift gears 10, 10', 10'' are provided to interconnect these wheels.

A coil spring 6 is inserted between the gears 4 and 5 and its ends are fixed to said gears after it has been loaded with a torsional bias of from one-fifth turn to two turns, and the gears 4 and 5 are then engaged with the corresponding gears 3 and 3'. As a consequence of this arrangement, the surfaces of the gear teeth are constantly biassed in a definite direction by the spring 6, the helical gear 3 against 5, the helical gear 3' against 4, the pinion 2 against the rack 1, and the pinion 2' against the rack 1, thus eliminating backlash.

In the present invention, two gear trains are provided and a twisted coil spring is inserted between these two gear trains to bias them rotationally in opposite directions. Consequently only a small rotational force need be applied to each train, and a weak spring suffices. Moreover, there is no likelihood that the spring will be overloaded. This also renders the counter compact. The addition of a gear train interlocked with the shafts 15', 16', even though this gear train has no direct bearing on the counter, facilitates the design of calipers in which the digital indication of the distance measured is free from the influence of gear backlash.

What is claimed is:

1. Slide calipers comprising:
   a. a beam carrying a rack,
   b. a slider slidably mounted on said beam,
   c. digital counting means rotatably mounted on the slider for digitally indicating the position of the slider relative to said beam,
   d. two driving gears rotatably mounted on said slider and meshing with said rack,
   e. two driven gears rotatably mounted on said slider at right angles to the axes of said driving gears, helical glaring through which each driven gear is driven from one of said driving gears, one of said driven gears connected to drive said counting means, while the other driven gear is journalled in axial alignment with said one driven gear and with said counting means, and f. resilient means rotationally biassing the two driven gears in opposite directions.

2. Slide calipers as claimed in claim 1 in which said resilient means is a helical spring coaxial with and positioned between said driven gears.

3. A device as claimed in claim 1 in which said driven gears are helical gears and are driven by said driving gears through intermediate helical gears at right angles thereto.

* * * * *